US009822812B2

(12) United States Patent
Ryu et al.

(10) Patent No.: US 9,822,812 B2
(45) Date of Patent: Nov. 21, 2017

(54) TILTING PAD JOURNAL BEARING FOR USE IN A TURBOCHARGER

(71) Applicant: BorgWarner Inc., Auburn Hills, MI (US)

(72) Inventors: Keun Ryu, Seoul (KR); Zachary Ashton, Arden, NC (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 14/913,711

(22) PCT Filed: Aug. 25, 2014

(86) PCT No.: PCT/US2014/052439
§ 371 (c)(1),
(2) Date: Feb. 23, 2016

(87) PCT Pub. No.: WO2015/034695
PCT Pub. Date: Mar. 12, 2015

(65) Prior Publication Data
US 2016/0215815 A1 Jul. 28, 2016

Related U.S. Application Data

(60) Provisional application No. 61/874,106, filed on Sep. 5, 2013, provisional application No. 61/933,448, filed on Jan. 30, 2014.

(51) Int. Cl.
*F16C 17/00* (2006.01)
*F16C 17/03* (2006.01)
*F01D 25/18* (2006.01)
*F02B 39/14* (2006.01)
*F16C 33/02* (2006.01)
(Continued)

(52) U.S. Cl.
CPC ............ *F16C 17/03* (2013.01); *F01D 25/186* (2013.01); *F02B 39/14* (2013.01); *F16C 17/035* (2013.01); *F16C 17/26* (2013.01); *F16C 27/02* (2013.01); *F16C 33/02* (2013.01); *F16C 33/1045* (2013.01); *F16C 35/02* (2013.01); *F05D 2220/40* (2013.01); *F16C 17/18* (2013.01); *F16C 2360/24* (2013.01)

(58) Field of Classification Search
CPC ........ F16C 17/03; F16C 17/035; F16C 17/18; F16C 17/26; F16C 27/02; F16C 33/02; F16C 35/02; F16C 2360/23; F16C 2360/24
See application file for complete search history.

(56) References Cited

U.S. PATENT DOCUMENTS 5,513,917 A * 5/1996 Ide .................. F16C 17/035 384/100
8,348,595 B2 1/2013 Koch et al.
(Continued)

*Primary Examiner* — James Pilkington

(57) ABSTRACT

A bearing housing (12) for a turbocharger having a rotatable shaft (14) passing through the bearing housing (12) with journal bearings (30) having tilting pads (40) for supporting the rotatable shaft (14) in the bearing housing (12). The tilting pads (40) may have oil supply holes (50) through each pad (40) to direct lubrication to each pad surface (44). The journal bearings (30) preferably have a circumferential groove (52) on an outer surface of the bearing aligned with the oil supply holes (50) to help feed oil to the oil supply holes (50).

11 Claims, 7 Drawing Sheets

(51) Int. Cl.
*F16C 35/02* (2006.01)
*F16C 17/26* (2006.01)
*F16C 27/02* (2006.01)
*F16C 33/10* (2006.01)
*F16C 17/18* (2006.01)

(56) References Cited

U.S. PATENT DOCUMENTS

| | | |
|---|---|---|
| 8,449,199 B2 | 5/2013 | Barlog |
| 9,599,149 B2 * | 3/2017 | Ryu ........................ F01D 25/16 |
| 2008/0019629 A1 * | 1/2008 | McKeirnan ........... F16C 35/077 |
| | | 384/493 |
| 2008/0087018 A1 | 4/2008 | Woollenweber |
| 2009/0110572 A1 | 4/2009 | Meacham et al. |
| 2011/0200422 A1 * | 8/2011 | Gutknecht .............. F01D 25/16 |
| | | 415/1 |
| 2013/0028731 A1 | 1/2013 | Mimura et al. |

* cited by examiner

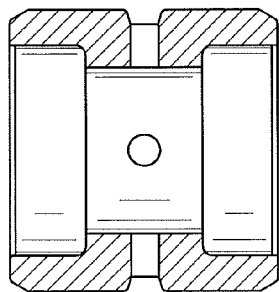
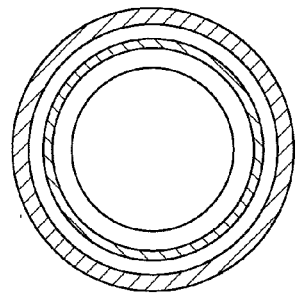
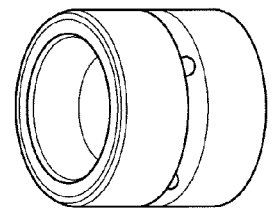
FIG. 6A
PRIOR ART
FIG. 6B
PRIOR ART
FIG. 6C
PRIOR ART
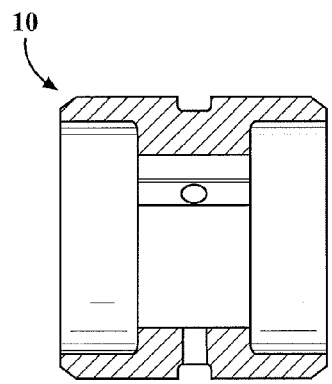
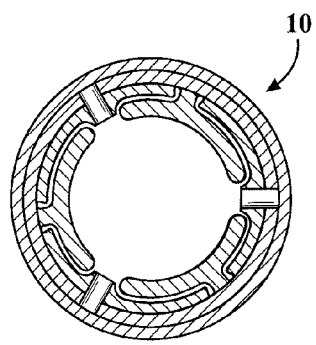
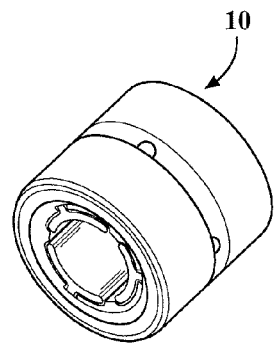
FIG. 7A
FIG. 7B
FIG. 7C
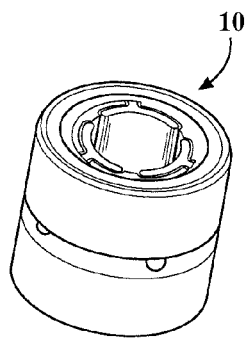
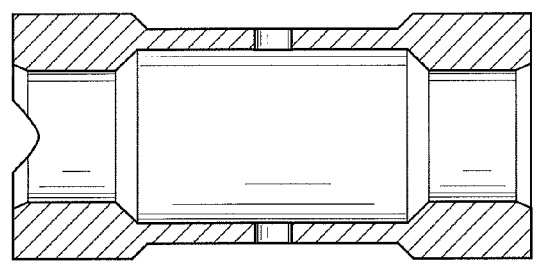
FIG. 7D
FIG. 8A
PRIOR ART

FIG. 12
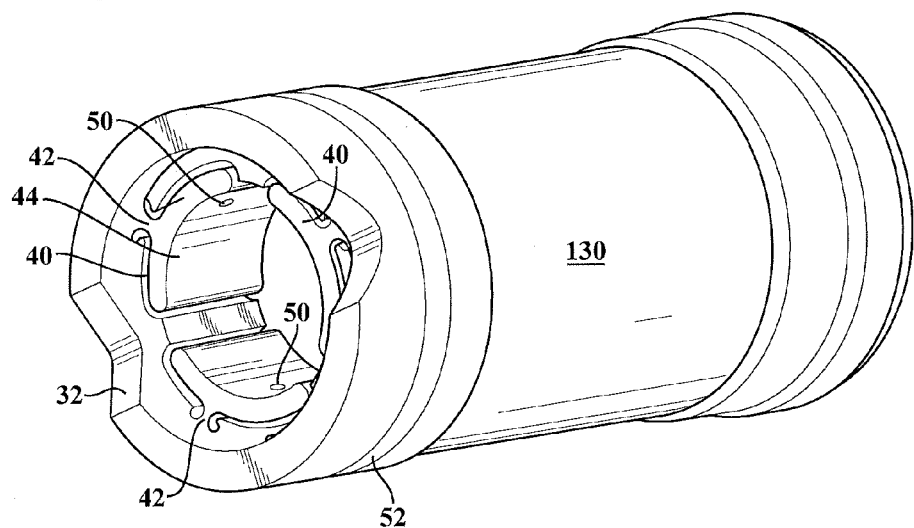
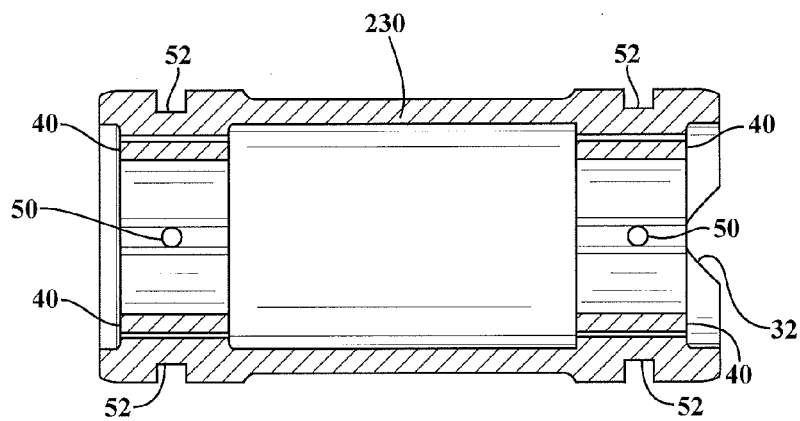
FIG. 13
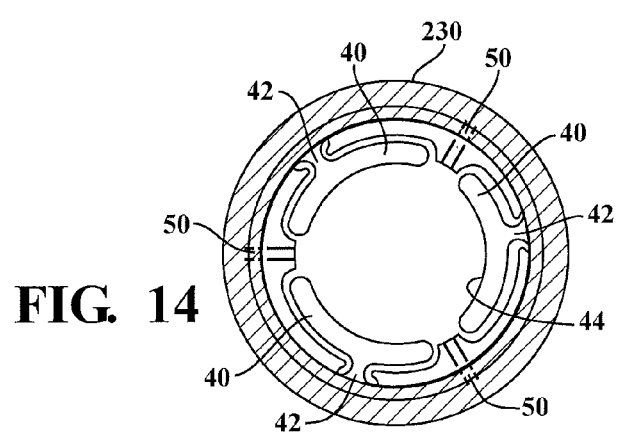
FIG. 14

TILTING PAD JOURNAL BEARING FOR USE IN A TURBOCHARGER

CROSS-REFERENCE TO RELATED APPLICATION

This application claims priority to and all the benefits of U.S. Provisional Applications filed on Sep. 5, 2013 as U.S. Provisional Application No. 61/874,106 entitled "Flexure Pivot Tilting Pad Journal Bearing For Use In A Turbocharger" and in the United States Patent and Trademark Office on Jan. 30, 2014 as U.S. Provisional Application No. 61/933,448 entitled "Directed Lubrication For Semi-Floating Flexure Pivot Tilting Pad Journal Bearing."

BACKGROUND

Field of the Invention

The present invention relates to floating ring journal bearing for use in a turbocharger. More particularly, the present invention relates to floating ring journal bearings having tilting pad bearings for radially supporting a shaft in a bearing housing of a turbocharger.

Description of Related Art

An exhaust gas turbocharger delivers compressed air to an engine intake, allowing more fuel to be combusted, thus boosting an engine's horsepower without significantly increasing engine weight. Turbochargers typically include a turbine housing connected to the engine's exhaust manifold, a center bearing housing, and a compressor housing connected to the engine's intake manifold. A turbine wheel in the turbine housing is rotatably driven by an inflow of exhaust gas supplied from the exhaust manifold. A shaft is rotatably supported in the center bearing housing connects the turbine wheel to a compressor impeller in the compressor housing so that rotation of the turbine wheel causes rotation of the compressor impeller. As the compressor impeller rotates, it increases the air mass flow rate, airflow density and air pressure delivered to the engine's cylinders via the engine's intake manifold.

Bearings are typically seated in the center bearing housing between the shaft and the center bearing housing for rotatably supporting the shaft. In some turbochargers, floating ring or semi-floating ring journal bearings are used to support the shaft. However, some floating ring or semi-floating ring bearings are associated with one or more sub-synchronous motions of large amplitude over extended operating speed ranges. It remains desirable to provide an improved journal bearing in a turbocharger to increase stability through the reduction of sub-synchronous responses of the rotating assembly and overall bearing loads.

SUMMARY

In some aspects, a fully- or semi-floating ring journal bearing is provided which is seated in the center bearing housing for radially supporting the shaft extending therethrough between the turbine wheel and the compressor impeller. The fully- or semi-floating ring journal bearing includes a plurality of tilting pad bearings along its inner surface adjacent the shaft. In some embodiments, the fully- or semi-floating ring journal bearing integrates the tilting pad bearings as a single piece bearing. The fully- or semi-floating ring tilting pad journal bearing advantageously provides reduced amplitude sub-synchronous shaft motion response when compared to some floating ring or semi-floating ring bearings formed without tilting pad bearings. As a result, vibration from the rotating shaft is reduced and the shaft and wheels are stabilized, thereby increasing the durability and efficiency of the turbocharger.

In some aspects, a lubrication system for semi-floating journal bearings having tilting pad bearings is provided. The lubrication system suitably restricts oil flow rates to the semi-floating tilting pad journal bearing. In some embodiments, the required oil flow rate is reduced by directing the oil to a close clearance, thus bringing the oil flow rates for a semi-floating tilting pad bearing in line with typical fixed-geometry semi-floating bearings.

In some aspects, lubricating oil is directed to the pad surface where lubrication is most crucial can eliminate wasteful oil flow in a semi-floating tilting pad journal bearing. Oil is supplied directly to the pad surface via oil supply holes through the tilting pad webs or via oil supply holes between the pads and relying on shaft rotation to pull the oil toward the pad surface.

The disclosed techniques include (1) directed lubrication to the pad surface through a tilting pad web and (2) directed lubrication between each pad (adjacent tilting pads) via oil supply holes. Both of these oil supply methods may be enhanced by a circumferential groove on the outer diameter of the bearing land to help feed the oil supply holes.

The diameter of the oil supply holes and location upstream and/or the pad to rotor clearance can aid in restricting oil flow and limiting oil to the key areas of thin film lubrication. Directed lubrication offers both lower overall flow rates and oil supply focused at the pad leading edge. Thus, directed lubrication for semi-floating journal bearings via oil supply holes between or through each pad can reduce overall oil flow rates and focus oil at the pad leading edge, where there is the greatest need for lubrication.

BRIEF DESCRIPTION OF THE DRAWINGS

The invention will be readily appreciated as the same becomes better understood by reference to the following detailed description when considered in connection with the accompanying drawings wherein:

FIG. 6A is a cross-sectional side view of a fully floating ring journal bearing;

FIG. 6B is an end view of the fully floating ring journal bearing of FIG. 6A;

FIG. 6C is a perspective view of the fully floating ring journal bearing of FIG. 6A;

FIG. 7A is a cross-sectional side view of a fully floating ring tilting pad bearing;

FIG. 7B is an end view of the fully floating ring tilting pad bearing of FIG. 7A;

FIG. 7C is a perspective view of the fully floating ring tilting pad bearing of FIG. 7A;

FIG. 7D is another perspective view of the fully floating ring tilting pad bearing of FIG. 7A;

FIG. 8A is a cross-sectional side view of a semi-floating ring journal bearing;

FIG. 12 is a perspective view of the bearing of FIG. 10;

FIG. 13 is a cross-sectional side view of a tilting pad bearing with three oil supply holes to feed oil between each tilting pad for directed lubrication; and FIG. 14 is an end view of the bearing of FIG. 13.

DETAILED DESCRIPTION

Figure 1:
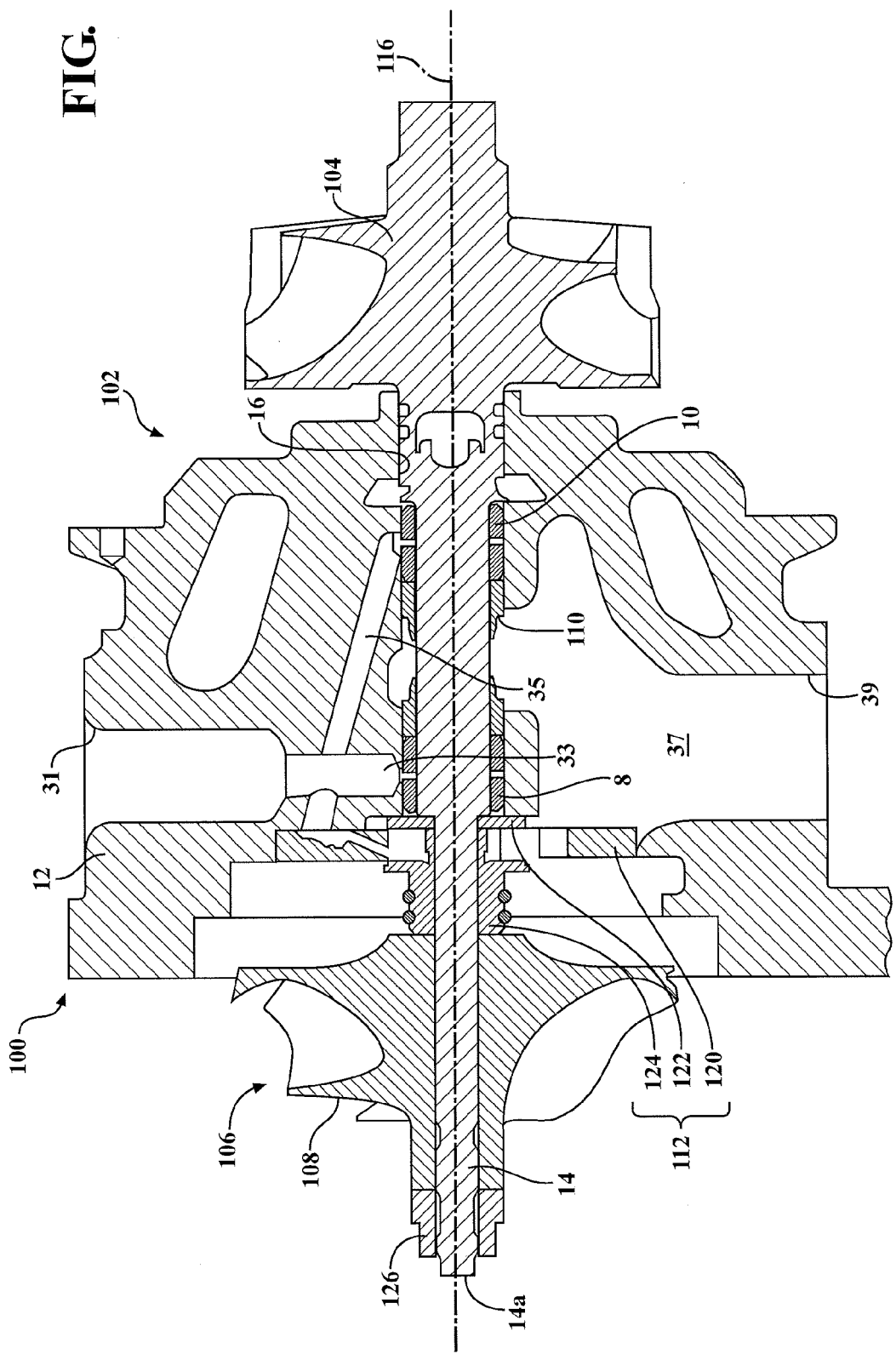
FIG. 1 is a cross-sectional view of an exhaust gas turbocharger including tilting pad journal bearings.

Referring to FIG. 1, an exhaust gas turbocharger 100 includes a turbine section 102, a compressor section 106, and a center bearing housing 12 disposed between, and connecting, the compressor section 106 to the turbine section 102. The turbine section 102 includes a turbine housing (not shown) and a turbine wheel 104 disposed in the turbine housing. The compressor section 106 includes a compressor housing (not shown) and a compressor impeller 108 disposed in the compressor housing. The turbine wheel 104 is connected to the compressor impeller 108 via a shaft 14. The shaft 14 is supported for rotation about a rotational axis 116 within a bore 16 formed in the bearing housing 12 via a pair of axially spaced journal bearings 8, 10. For example, a compressor-side journal bearing 8 supports the shaft 14 adjacent the compressor section 106, and a turbine-side journal bearing 10 supports the shaft 14 adjacent to the turbine section 102. The journal bearings 8, 10 are fully-floating ring tilting pad bearings, as discussed further below.

The axial spacing between the compressor-side journal bearing 8 and the turbine-side journal bearing 10 is maintained by cylindrical a journal bearing spacer 110. In addition, a thrust bearing assembly 112 is disposed in the bearing housing 12 so as to provide axial support for the shaft 14. The shaft 14 is reduced in diameter on the compressor side of the compressor-side journal bearing 8, and a shoulder is formed at the transition between diameters. The compressor impeller 108 and the thrust bearing assembly 112, including a thrust bearing 120, a thrust washer assembly 122, and an oil flinger 124, are all supported on the shaft 14 in the reduced diameter portion. The terminal end 14a of the shaft 14 extends axially beyond the compressor impeller 108 and includes an external thread. A nut 126 engages the thread, and is tightened sufficiently to clamp the compressor impeller 108 and the thrust bearing assembly 112 against the shoulder.

In use, the turbine wheel 104 in the turbine housing is rotatably driven by an inflow of exhaust gas supplied from the exhaust manifold of an engine. Since the shaft 14 connects the turbine wheel 104 to the compressor impeller 108 in the compressor housing, the rotation of the turbine wheel 104 causes rotation of the compressor impeller 108.

As the compressor impeller 108 rotates, it increases the air mass flow rate, airflow density and air pressure delivered to the engine's cylinders via an outflow from the compressor section 106, which is connected to the engine's air intake manifold (not shown).

The turbocharger bearing system is lubricated by oil from the engine. Fluid, such as oil, is circulated in the center bearing housing 12 to lubricate the journal bearings 8, 10, shaft 14 and housing walls. The oil is fed under pressure into the bearing housing 12 via an oil supply port 31 to lubricate the bearing surfaces within and about the journal bearings 8, 10. More specifically, oil passes through individual bearing supply channels 33 and 35 to lubricate the thrust bearing assembly 112 and the journal bearings 8, 10. The supply channels 33 and 35 open at generally axially centered positions with respect to the two journal bearings 8, 10 such that oil flow may occur in both directions axially to lubricate the bearing surfaces. The journal bearings 8, 10 have axially-centered lubricating oil flow ports or apertures 36 that receive oil from the respective supply channels 33, 35. In some embodiments, oil making its way toward the compressor section 106 can be blocked by an insert and a sealing system between the bearing housing and the compressor housing as shown in BorgWarner's U.S. Pat. No. 8,348,595, which is incorporated herein by reference. Oil flowing over and through the journal bearings 8, 10 is eventually collected within a bearing housing sump chamber 37 for return circulation through an outlet port 39.

Figure 2:
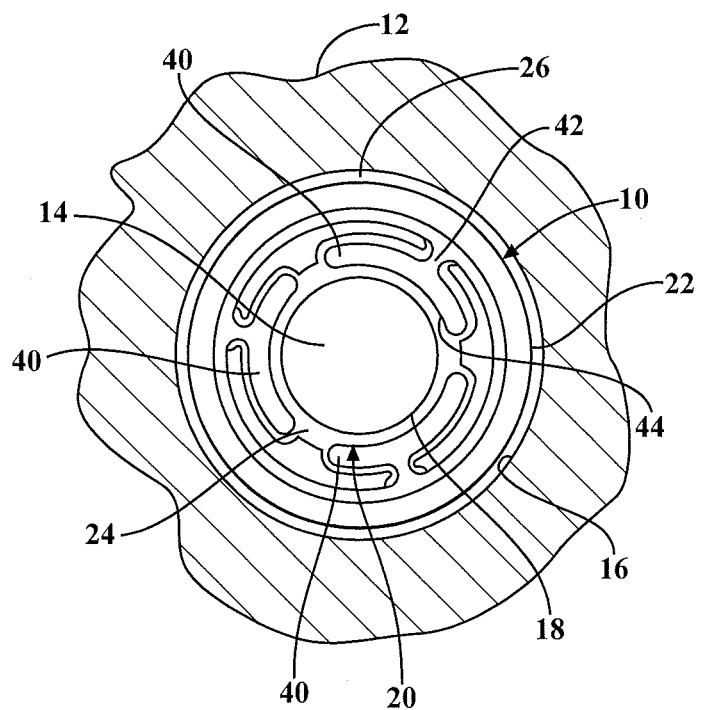
FIG. 2 is a schematic end view of a fully-floating tilting pad journal bearing.
Figure 3:
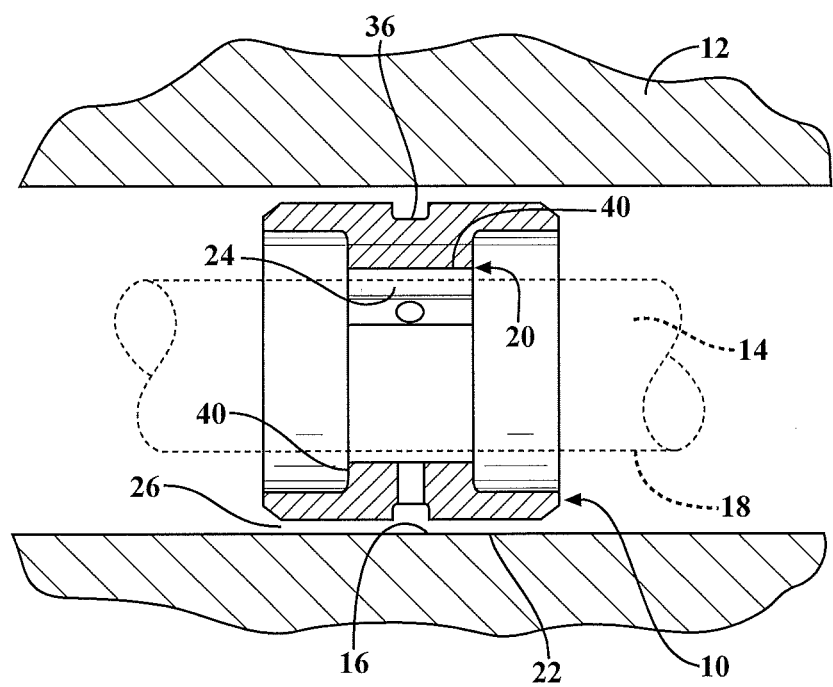
FIG. 3 is a cross-sectional side view of the tilting pad bearing of FIG. 2.

Referring to FIGS. 2 and 3, the fully-floating ring tilting pad journal bearings 8, 10 are substantially structurally similar, whereby only the turbine-side journal bearing 10 will be described in detail. The journal bearing 10 radially supports the shaft 14 within the center bearing housing 12, and functions to prevent contact therebetween and control the motion of the rotating shaft 14. In hydrodynamic lubrication, oil remains between the bearing 10, the shaft 14 and the bore 16, creating a fluid film and preventing metal-to-metal contact. The journal bearing 10 forms two hydrodynamic oil films; an outer film 26 between the center bearing housing bore 16 and the journal bearing outer surface 22, and an inner film 24 between the journal bearing inner surface 20 and an outer surface 18 of the shaft 14, thereby allowing the journal bearing 10 to float between the inner and outer films 24, 26 in the center bearing housing 12. In addition, the bearing 10 is allowed to spin or rotate around the shaft 14 without directly contacting the bearing 10 or bearing housing 12.

In the fully-floating ring tilting pad journal bearing 10, the inner oil film 24 and an outer oil film 26 both function as bearing surfaces. This can be compared to corresponding inner and outer oil films that are provided in a semi-floating ring tilting pad journal bearing, in which the inner oil film functions as a bearing surface but the outer oil film functions as a damper. In this regard, the fully-floating ring tilting pad journal bearing 10 is advantageous relative to some similar semi-floating ring tilting pad journal bearings since, in use, the fully-floating ring tilting pad journal bearing 10 introduces less lower power loss than the semi-floating counterpart.

Figure 5:
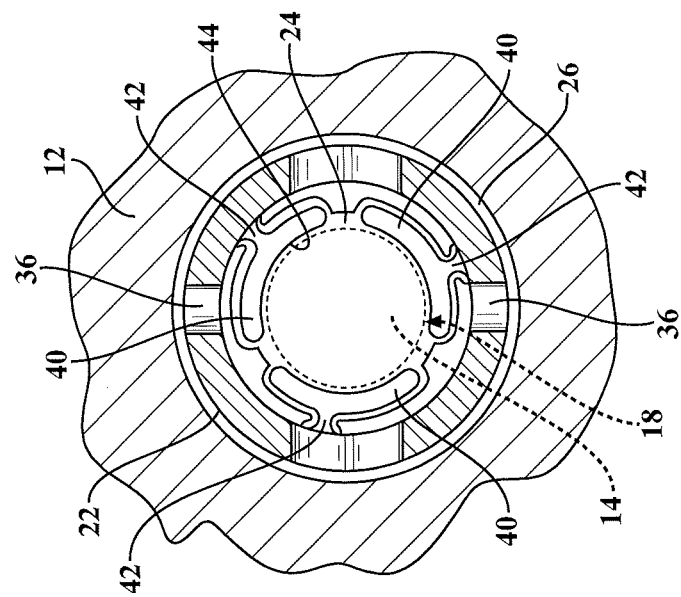
FIG. 5 is an end view of the bearing of FIG. 4.
Figure 4:
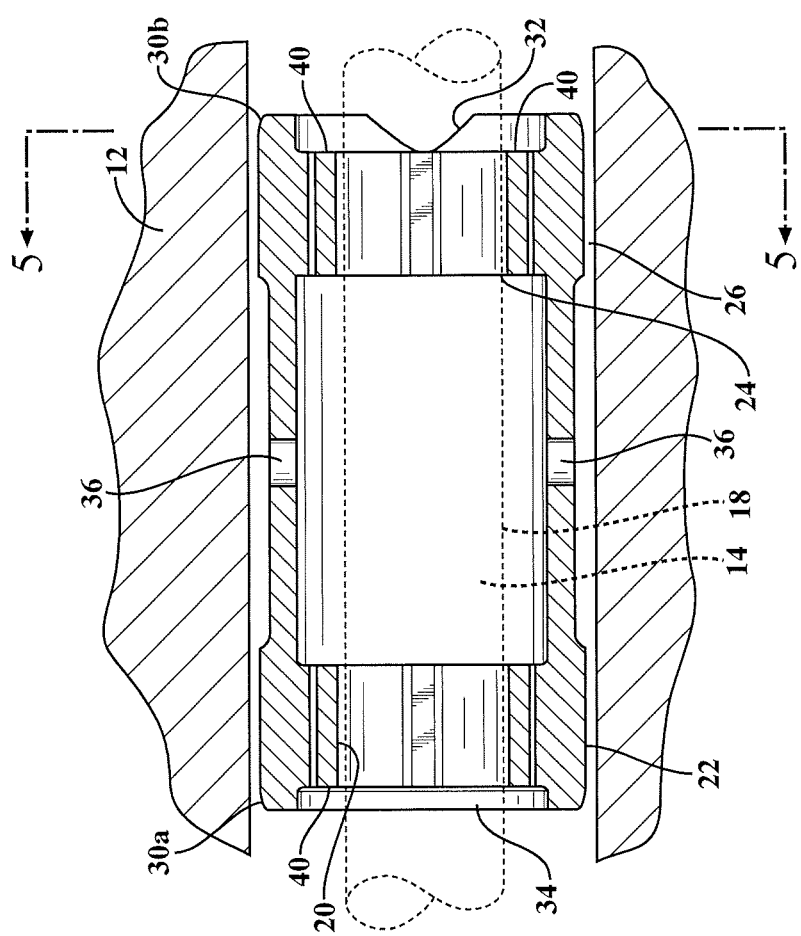
FIG. 4 is a cross-sectional side view of a semi-floating tilting pad bearing.

Referring to FIGS. 4 and 5, an alternative embodiment journal bearing is a semi-floating ring tilting pad journal bearing 30 that is similarly seated within the center bearing housing 12 and rotatably supports the shaft 14. Again, oil is circulated through the center bearing housing 12 and forms an inner clearance or inner oil film 24 between the shaft outer surface 18 and bearing inner surface 20 and an outer clearance or outer oil film 26 between the bearing outer surface 22 and the housing inner surface 16. The bearing 30 floats between the inner and outer oil films 24, 26, however, the bearing 30 includes a retaining notch 32 in the distal end thereof for receiving an anti-rotation pin 34 secured to the bearing housing 12 to prevent rotation of the bearing 30. The outer oil film acts as a squeeze film damper for damping motion of the shaft 14.

Each of the bearings 10, 30 also include a plurality of tilting pad bearings 40 extending circumferentially from the bearing inner surface 20 and around the shaft outer surface 18. The tilting pad bearings 40 are integrally formed with the bearing wall forming the bearing inner surface 20. For example, the tilting pad bearings 40 are integrally connected with the bearing inner surface 20 by a radially-extending connecting membrane 42, and form a circumferentially-extending inner pad surface 44 adjacent to, and facing, the shaft outer surface 18. In some embodiments, the bearings 10, 30 are machined as a single piece. The tilting pad bearings 40 are allowed to pivot about the connecting membrane 42 in response movement of the shaft 14 to minimize vibration between the shaft 14 and bearing housing 12; stabilize the rotation of the shaft 14, turbine wheel and compressor impeller; and thereby increase the durability and efficiency of the turbocharger while reducing vibration levels.

The bearing 10 of FIGS. 2 and 3 include the tilting pad bearings 40 formed in the center of the bearing inner surface 20. In contrast, the bearing 30 of FIGS. 4 and 5 includes two sets of the tilting pad bearings 40, with one set of three, four, or more flexure tilting pads 40 at one axial end 30a of the bearing 30, and the other set of three, four, or more flexure tilting pads 40 at the opposed axial end 30b of the bearing 30. That is, the tilting pad bearings 40 are formed at opposed ends of the bearing 30, and hence are in series.

Figure 8B:
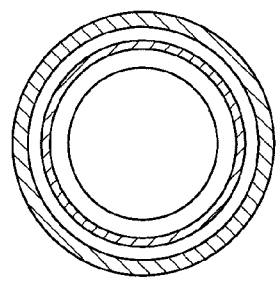
FIG. 8B is an end view of the semi-floating ring journal bearing of FIG. 8A.
Figure 8C:
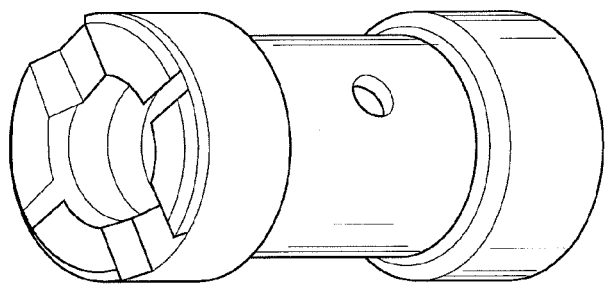
FIG. 8C is a perspective view of the semi-floating ring journal bearing of FIG. 8A.
Figure 9A:
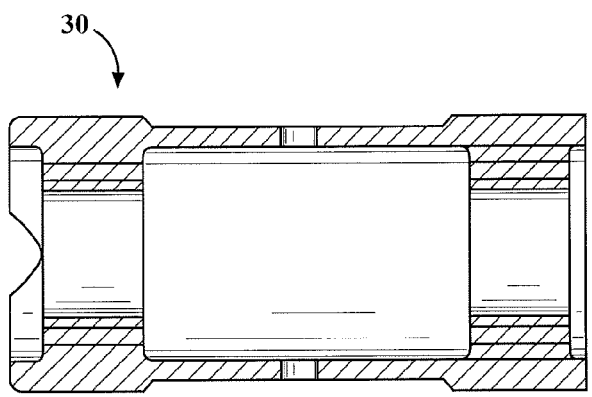
FIG. 9A is a cross-sectional side view of a semi-floating ring tilting pad journal bearing.
Figure 9B:
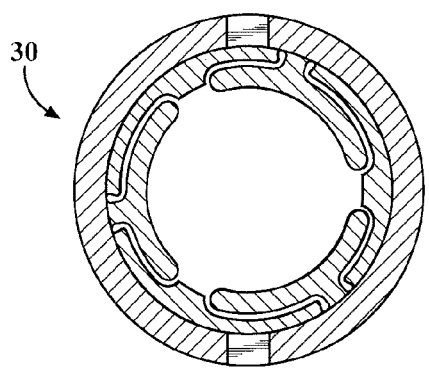
FIG. 9B is an end view of the semi-floating ring tilting pad journal bearing of FIG. 9A.
Figure 9C:
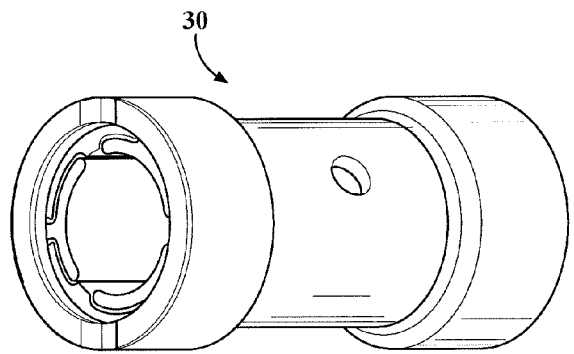
FIG. 9C is a perspective view of the semi-floating ring tilting pad journal bearing of FIG. 9A.
Figure 9D:
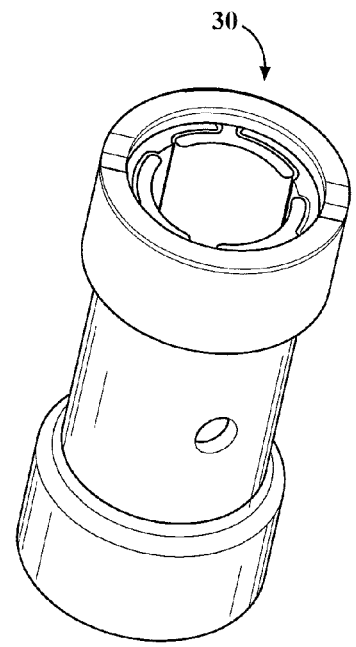
FIG. 9D is another perspective view of the semi-floating ring tilting pad journal bearing of FIG. 9A.

FIGS. 6A-6C illustrate a fully floating ring journal bearing. FIGS. 7A-7D illustrate a fully floating ring flexure pivot tilting pad journal bearing 10 with a plurality of tilting pad bearings 40 formed in the center of the bearing inner surface. FIGS. 8A-8C illustrate a semi-floating ring journal bearing. In addition, FIGS. 9A-9D illustrate a semi-floating flexure pivot tilting pad journal bearing 30 with a plurality of tilting pad bearings 40 in series formed about the opposing ends of the bearing inner surface.

The tilting pad journal bearings 10, 30 of the present invention provide a stable rotor-bearing system in the turbocharger with minimized bearing force transmitted to the bearing housing and small overall shaft motion response amplitude thereby providing increased durability and reduced noise, vibration and harshness (NVH) issues, less tolerance and critical balance lever requirements, and enhanced overall turbocharger efficiency due to decreased bearing power loss.

Referring again to FIGS. 4 and 5, as previously discussed, the semi-floating tilting pad journal bearings 30 rely on pressurized oil feed to the inner bearing span. Oil is typically transported through supply channels 33, 35 to the oil feed ports 36 of the semi-floating ring tilting pad journal bearings 30. The oil flow is supplied to the center of the bearing span via the oil feed ports 36. The oil then flows axially to the pad clearance and around the pads 40. This arrangement can sometimes result in overall turbo oil flow rates that can be eight to ten times normal levels since the paths around the outer surface of the pads 40 leave a large additional flow area for the oil to flow and escape. The semi-floating ring tilting pad bearing with "flooded" lubrication has inefficient oil flow around the pads 40, may not provide practical lubrication and can result in an excessive oil flow rate. Thus, oil-flow apertures 36 in the center of the bearing span may cause wasteful oil flow in a semi-floating tilting pad journal bearing 30.

Figure 10:
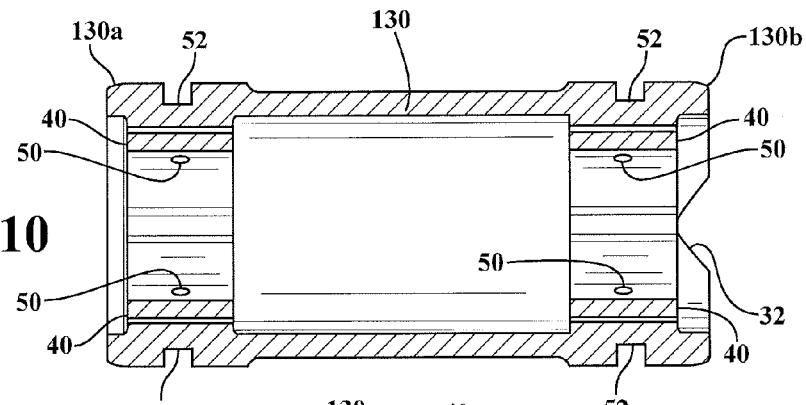
FIG. 10 is a cross-sectional side view of a tilting pad bearing with oil supply holes through the tilting pad web to feed oil for directed lubrication.
Figure 11:
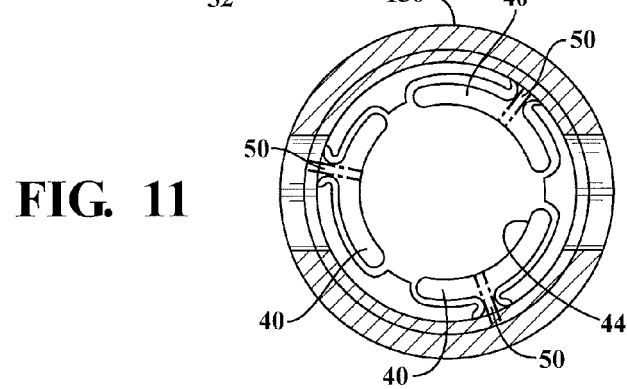
FIG. 11 is an end view of the bearing of FIG. 10.

Referring to FIGS. 10-12, an alternative semi-floating ring tilting pad journal bearing 130 includes tilting pad bearings 40 in series around the bearing inner surface 20. As a result, the semi-floating ring tilting pad journal bearing 130 provides a stable rotor-bearing system in the turbocharger 100 with minimized bearing force transmitted to the bearing housing 12 and small overall shaft motion response amplitude thereby providing increased durability and reduced noise, vibration and harshness (NVH) issues, less tolerance and critical balance lever requirements, and enhanced overall turbocharger efficiency due to decreased bearing power loss.

The semi-floating ring tilting pad journal bearing 130 is also configured to address inefficient oil flow. In particular, rather than oil only being fed into the inner bearing span via axially-central apertures 36, the semi-floating ring tilting pad journal bearing 130 includes directed lubrication. For example, the semi-floating ring journal bearings 130 with tilting pad bearings 40 can have oil feeds in conjunction with each of the tilting pad bearings 40. Oil is supplied directly to the inner pad surface 44 via oil supply holes 50. The oil supply holes 50 are formed adjacent the axial ends 130a, 130b rather than centrally, and the oil supply holes 50 extend radially through the tilting pad connecting membrane 42 (FIG. 11). In this embodiment, lubrication is directed through each tilting pad 40 to a central region of the inner pad surface 44 (FIG. 12). Oil supply holes 50 are shown through each of the three pads 40. This allows oil flow to be directed where needed most and minimizes paths for unusable flow. A circumferential groove 52 on an outer surface of the bearing 130 is axially aligned with the oil supply holes 50 and facilitates oil feed to each oil supply hole 50 to enhance the oil supply.

Directed lubrication provides for suitably restricting oil flow rates to the semi-floating tilting pad journal bearing 130. The oil flow rate for the semi-floating tilting pad journal bearing 130 can be reduced, for example relative to the configuration of the semi-floating tilting pad journal bearing 30 shown in FIG. 4, by directing the oil to a close clearance. Directing lubricating oil to the inner pad surface 44 where lubrication is most crucial can eliminate wasteful oil flow in the semi-floating ring tilting pad journal bearing 130.

Referring to FIGS. 13 and 14, directed lubrication is not limited to providing oil via oil supply holes 50 formed through the connecting membrane 42. For example, an alternative embodiment semi-floating ring tilting pad journal bearing 230 includes directed lubrication via oil supply holes 50 located between adjacent tilting pad bearings 40 and relying on shaft rotation to pull the oil toward the inner pad surface 44. In this embodiment, the oil supply holes 50 open at a leading edge of each tilting pad 40.

In the illustrated embodiment, lubrication is directed between each tilting pad bearing via oil supply holes 50. Oil flow is directed where needed and minimizes paths for unusable flow behind the tilting pad bearings 40. This oil supply method may also be enhanced by a circumferential groove 52. The circumferential groove 52 is formed on an outer surface of the bearing 230 and is axially aligned with the oil supply holes 50, facilitating oil feed to each oil supply hole 50 to enhance the oil supply. The circumferential groove 52 preferably aligns with the oil supply holes 50 for directed flow of oil.

With oil supply holes 50 in association with the tilting pad bearings 40 by either method, the two oil feed apertures 36 to the inner bearing span may be eliminated with a solid bearing surface to alter flooded lubrication of excessive oil to the center of the bearing span.

The diameter of the oil supply holes 50 and location upstream and/or the pad-to-rotor clearance can aid in restricting oil flow and limiting oil to the key areas of thin film lubrication. Directed lubrication via oil supply holes 50 between or through each tilting pad 40 offers both lower overall flow rates and oil supply focused where needed, such as at the pad leading edge.

Selected illustrative embodiments of the invention are described above in some detail. It should be understood that only structures considered necessary for clarifying the journal bearings and lubrication system have been described herein. Other conventional structures, and those of ancillary and auxiliary components of the system, are assumed to be known and understood by those skilled in the art. Moreover, while working examples of the journal bearings and lubrication system have been described above, the journal bearings and lubrication system are not limited to the working examples described above, but various design alterations may be carried out as set forth in the claims.

What is claimed is:

1. A single-piece journal bearing (30, 130, 230) that is a fully-floating or semi-floating tilting pad bearing comprising:
   a bearing outer surface (22) that is adapted to be received by a center bearing housing (12) of a turbocharger (100),
   a bearing inner surface (20) that is adapted to receive a rotating shaft (14) of the turbocharger (100),
   a first set of tilting pads (40) at one axial end (30a) of the bearing (30, 130, 230) and a second set of tilting pads (40) at another axial end (30b) of the bearing (30, 130, 230) arranged circumferentially about the bearing inner surface (20), wherein the tilting pads (40) are integrally connected with the bearing inner surface (20) by a connecting membrane (42) and rotate, precess, or both relative to the bearing housing (12), and
   a radially-extending oil supply hole (50) that is formed in the bearing (30, 130, 230) and passes through at least one tilting pad (40) and its corresponding connecting membrane (42).

2. The single-piece journal bearing (30, 130, 230) of claim 1, wherein
   the connecting membrane (42) is configured to permit the tilting pads (40) to pivot relative to the bearing inner surface (20).

3. The single-piece journal bearing (30, 130, 230) of claim 1, further comprising
   a groove (52) formed on the bearing outer surface (22) and adapted to feed oil to the oil supply hole (50).

4. The single-piece journal bearing (30, 130, 230) of claim 3, wherein the groove (52) extends circumferentially and is axially aligned with the oil supply hole (50).

5. A turbocharger (100) comprising:
   a bearing housing (12) defining an axial bore (16);
   a rotatable shaft (14) disposed in the bore (16),
   a single-piece journal bearing (30, 130, 230) that is fully-floating or semi-floating disposed in the bore (16) and configured to rotatably support the shaft (14), the bearing (30, 130, 230) including
   a bearing outer surface (22),
   a bearing inner surface (20),
   a first set of tilting pads (40) at one axial end (30a) of the bearing (30, 130, 230) and a second set of tilting pads (40) at another axial end (30b) of the bearing (30, 130, 230) arranged circumferentially about the bearing inner surface (20), wherein the tilting pads (40) are integrally connected with the bearing inner surface (20) by a connecting membrane (42) and rotate, precess, or both relative to the bearing housing (12), and
   a radially-extending oil supply hole (50) that is formed in the bearing (30, 130, 230) and passes through at least one tilting pad (40) and its corresponding connecting membrane (42).

6. The turbocharger (100) of claim 5, wherein the connecting membrane (42) is configured to permit the tilting pads (40) to pivot relative to the bearing inner surface (20).

7. The turbocharger (100) of claim 5, further comprising
   a groove (52) formed on the bearing outer surface (22) and adapted to feed oil to the oil supply hole (50).

8. The turbocharger (100) of claim 7, wherein the groove (52) extends circumferentially and is axially aligned with the oil supply hole (50).

9. The turbocharger of claim 5 wherein rotation of the rotatable shaft (14) pulls oil through each tilting pad (40) via the oil supply holes (50) to each pad surface (44).

10. A turbocharger (100) comprising:
    a bearing housing (12) defining an axial bore (16);
    a rotatable shaft (14) disposed in the bore (16),
    a single-piece journal bearing (10, 30, 130, 230) that is fully-floating or semi-floating disposed in the bore (16) and configured to rotatably support the shaft (14), the bearing including
    a bearing outer surface (22) that is spaced apart from an inner surface of the bore (16),
    a bearing inner surface (20),
    a first set of tilting pads (40) at one axial end (30a) of the bearing (30, 130, 230) and a second set of tilting pads (40) at another axial end (30b) of the bearing (30, 130, 230) arranged circumferentially about the bearing inner surface (20), wherein the tilting pads (40) are integrally connected with the bearing inner surface (20) by a connecting membrane (42) and rotate, precess, or both relative to the bearing housing (12),
    wherein the journal bearing is disposed in the bore (16) in a manner such that the journal bearing is free to rotate, precess, or both relative to both the inner surface of the bore (16) and an outer surface of the shaft (14).

11. The turbocharger (100) of claim 10, comprising an oil lubrication path (50) formed in the bearing housing and configured to deliver oil to the journal bearing (130), wherein
    an outer oil layer (26) is formed between the bearing outer surface and a surface of bore (16),
    an inner oil layer (24) is formed between the bearing inner surface and the shaft (14), and
    both the inner oil layer (24) and the outer oil layer (26) function as a bearing surface during operation of the turbocharger (100).

* * * * *